Patented Feb. 29, 1944

2,343,090

UNITED STATES PATENT OFFICE 2,343,090

TREATMENT OF TEXTILES AND COMPOSITION USEFUL THEREFOR

Joseph Edward Smith, Wilmington, Del., assignor to E. I. du Pont de Nemours & Company, Wilmington, Del., a corporation of Delaware No Drawing. Application August 3, 1940,
Serial No. 351,084

17 Claims. (Cl. 260—32)

This invention relates to resin dispersions of polymerized conjugated compounds substantive to animal fibers, nylon and cellulosic fibers, and more particularly to resin dispersions of methacrylic acid esters or vinyl alcohol esters substantive to animal fibers, nylon, natural cellulose, regenerated cellulose, cellulose esters and cellulose ethers.

This invention has as an object the preparation of resin dispersions substantive to animal fibers, nylon, and cellulosic fibers. A further object is the preparation of resin dispersions of polymerized conjugated compounds. A still further object is the preparation of resin dispersions of methacrylic acid esters and vinyl alcohol esters substantive to animal fibers, nylon, natural cellulose, regenerated cellulose esters and to cellulose ethers. Other objects will appear hereinafter.

These objects are accomplished by the following invention. An aqueous solution of a partially saponified polyvinyl acetate and a cationic surface active agent is agitated vigorously with one or more liquid conjugated compounds containing a small amount of benzoyl peroxide. During agitation a salt of a polyvalent metal, preferably aluminum acetate, aluminum formate, or barium chloride, and a volatile organic acid, preferably acetic acid or formic acid are added. The emulsion is heated to produce polymerization of the conjugated compounds. The resulting resin dispersion is stable to storage for months. The dispersion is substantive to animal fibers, nylon and cellulosic fibers. As an alternative method of preparation, the polyvalent or heavy metal salt and the volatile organic acid may be added to the dispersion after polymerization to obtain equivalent substantivity and stability in the dispersion.

The preparation of aqueous dispersions of polymerized conjugated compounds and of aqueous dispersions substantive to animal fibers is described in my copending applications, Serial Numbers 351,082 and 351,083, filed on this same day. The dispersions described in these applications are not sufficiently substantive to cellulosic fibers to be applied commercially by a process of exhaustion from a long bath. It is frequently essential to apply resin dispersions to cellulosic materials or to mixed fibers by a process of exhaustion from a bath, particularly to knitted goods that cannot conveniently be handled in a quetsch.

In carrying out the invention, an aqueous solution of a partially saponified polyvinyl acetate and a cationic surface active agent is agitated vigorously with one or more liquid conjugated compounds containing a small amount of benzoyl peroxide. An aluminum or a barium salt together with an acid is added while continuing the agitation. A stable emulsion is obtained. The emulsion is heated, preferably to a temperature above 60° C., to induce polymerization of the emulsified monomer. The benzoyl peroxide acts as an oxidation catalyst to promote the polymerization of the monomer. Stable dispersions are produced, which are substantive to cellulosic fibers as well as animal fibers and nylon in properly selected pH ranges.

As an alternative method for carrying out the invention, the aluminum or barium salt and the acid may be added to the dispersion after the polymerization process.

It frequently is desirable to use plasticizers in the resin compositions to obtain the desired sizing effect. Plasticizers satisfactory for use with methacrylate derivatives are described by Strain et al. in Ind. & Eng. Chem. 31, 382 (1939).

These plasticizers may be included in the resin compositions described in this invention without effecting the affinity of the resin particles for cellulosic fibers, animal fibers and nylon.

The compositions described in this invention have a variable affinity for different textile materials and must be applied in a selected pH range to exhibit their best affinity particularly for textile fibers and paper. The dispersions have a greater affinity for animal fibers and nylon than for cellulosic fibers and modified cellulosic materials; however practically complete exhaustion of the dispersed particles from a bath onto any of the textile materials or paper can be obtained under properly selected conditions.

The particles of the dispersions described in this invention have the common property of carrying a positive charge as can be shown by the fact that they migrate from anode to cathode under the influence of an electric current. The textile fibers to which these dispersions are applied carry a negative charge under the conditions of application. While it is a necessary condition that the textile fiber and the dispersed resin carry opposite charges for adsorption to occur, it is not a sufficient condition. It has been found that the presence of cationic surface active agents or glue in the application bath not intimately associated with the dispersed phase may exert a strong retarding action on the adsorption of the dispersed resin by the textile fibers. It is known that cationic surface active agents have a high affinity for animal fibers and for cellulosic fibers and it appears that these materials in the bath compete with the resin particles for the fiber and in this way retard, or in extreme cases inhibit, their adsorption. However, if the cationic surface active agents are used as dispersing agents during the formation of the resin dispersion, they become associated with the particle in such manner that they increase its affinity for the textile material. It is necessary, in order to obtain the best results, that a large excess of the cationic surface active agent above that required to stabilize the dispersion be avoided; otherwise, the excess surface active agent may act to prevent efficient absorption of the emulsion.

It has been found that dispersions prepared with a multivalent metal salt or heavy metal salt to provide a positive charge on the emulsion particle have a strong affinity for animal fibers and nylon on the alkaline side of the isoelectric point of the fibers where the fibers are negatively charged. However, these dispersions do not have an affinity for cellulosic fibers that is sufficient to make possible their application by processes of adsorption from the bath. It is necessary, in order to obtain satisfactory substantivity of dispersions for cellulosic fibers, that the dispersions contain a cationic surface active agent. The best substantivity is obtained with dispersions which contain a multivalent metal or heavy metal salt, as an aluminum or barium salt, in addition to the cationic surface active agent. It is in addition necessary to apply these dispersions under conditions such that the cationic surface active agent used has a strong affinity itself for the fibers. The polyvinyl alcohol derivatives have no affinity for the textile fibers and do not promote or interfere in obtaining substantive properties in the dispersions. The polyvinyl alcohol derivatives are used in these compositions to improve the stability of the dispersions and thus make them satisfactory for commercial application.

Partially saponified polyvinyl acetate is highly soluble in water, but is difficult to dissolve rapidly since the material tends to form lumps surrounded by a gelatinous film on contact with water. The gelatinous film retards the rate of penetration into the mass and it is necessary to agitate for several days to obtain a solution. However, if the water contains 1% of a surface active agent, as for example technical dodecyl diethyl cyclohexylamine sulfate, on the weight of the partially saponified polyvinylacetate, a much more rapid rate of solution is obtained, particularly at elevated temperatures. A concentrated solution of a polyvinyl alcohol derivative can be prepared in 30 minutes at 160° F. with good agitation provided the wetting agent is present. The inclusion of the small amount of technical dodecyl diethyl-cyclohexylamine sulfate with the polyvinyl alcohol derivatives in the emulsion has no detrimental effect on the ultimate stability of the dispersed product. It is advantageous to use a small amount of technical dodecyl diethylcyclohexylamine sulfate in the preparation of the emulsion to assist in dissolving the polyvinyl alcohol derivative.

The following examples are illustrative of the application of the invention but are not intended as limiting it in any way. Parts are given by weight unless it is otherwise indicated.

*Example 1*

25 parts of n-butyl methacrylate monomer containing 0.25 part of benzoyl peroxide were mixed with 70.7 parts of an aqueous solution containing 2.5 parts of a partially saponified polyvinyl acetate, 0.025 part of technical dodecyl diethylcyclohexylamine sulfate, and 0.5 part of stearyl trimethyl ammonium bromide by means of a high-speed mixer. The saponification number of the polyvinyl acetate was 109 and the viscosity of a 4% aqueous solution at 20° C. was 20 c. p. 3.8 parts of a 32% basic aluminum acetate solution and 0.5 part of acetic acid were added while continuing the agitation. After agitating for a total of 3 minutes a stable emulsion was obtained. The emulsion was heated for 4 hours at 67° C. to obtain a dispersion of a resinous polymer. The dispersion obtained was stable.

*Example 2*

0.5 gram of the product from Example 1 was dispersed in 200 cc. of soft water and the pH of the bath adjusted to 4.5. The bath was placed in a pint Mason jar and a 10 gram strip of viscose process rayon crepe was entered in the jar. The bath was agitated for 15 minutes at 95° F. At least 90% of the resin dispersion was absorbed by the goods from the bath. The degree of exhaustion was judged by a comparison of the exhausted bath with standards of known concentration. The goods were hydro-extracted and dried on a mangle. A full hand with appreciable stiffness was obtained on the goods.

*Example 3*

Cellulose acetate piece-goods were treated as in Example 2. At least 90% of the dispersion exhausted from the bath onto the goods. Considerable body was added to the goods on drying on a mangle.

*Example 4*

0.75 gram of the product from Example 1 was dispersed in 200 cc. of soft water and the pH of the bath adjusted to 5.6 by the addition of ammonia. A full-fashioned silk stocking weighing 15 grams was entered in the bath in a pint Mason jar. The bath was agitated for 10 minutes at 80° F. and for 5 minutes at 100° F. The dispersion exhausted almost completely from the bath onto the stocking. The stocking was hydro-extracted and dried on an electrically heated form. The resin treament added considerable body and fullness to the stocking.

*Example 5*

0.5 gram of the product from Example 1 was dispersed in 200 cc. of soft water and the pH of the bath adjusted to 6.0 by the addition of ammonia. The bath, together with a 10 gram full-fashioned nylon stocking, was added to a pint Mason jar. The jar was agitated for 5 minutes at 100° F. and 25 minutes at 120° F. Practically all of the dispersed resin was absorbed by the stocking from the bath. The stocking was extracted and dried on an electrically heated form. The resin treatment added considerable fullness and firmness to the stocking.

*Example 6*

0.5 gram of the product from Example 1 was dispersed in 200 cc. of soft water and the pH of the bath adjusted to 6.0. The bath was contained in a pint Mason jar. A ten-gram piece of wool serge was entered in the bath and the bath agitated for 20 minutes at 120° F. Practically all of the resin dispersion was absorbed from the bath by the goods. The goods were extracted and dried on a mangle. Considerable body and stiffness were added to the goods by the treatment.

*Example 7*

A mixture of 12.5 parts of n-butyl methacrylate monomer and 12.5 parts methyl methacrylate monomer containing 0.25 part of benzoyl peroxide was substituted for the n-butyl methacrylate of Example 1, emulsified and polymerized to obtain a stable resin dispersion.

*Example 8*

The product of Example 7 was exhausted from dilute aqueous dispersions by viscose process rayon, cellulose acetate rayon, silk, wool, and nylon when applied as in Examples 2, 3, 4, 5 and 6. Fullness, body, and stiffness were added to the fabrics.

*Example 9*

25 parts of methyl methacrylate monomer containing 0.25 part of benzoyl peroxide were emulsified and polymerized as in Example 1. A stable resin dispersion was obtained.

*Example 10*

The product of Example 9 was exhausted from dilute aqueous dispersions by viscose process rayon, cellulose acetate rayon, silk, and nylon, when applied as in Examples 2, 3, 4 and 5. Excellent delustering, added fullness, but no increase in stiffness were obtained on the fabrics.

*Example 11*

20 parts of methyl methacrylate monomer containing 5 parts of di-(methylcyclohexyl) adipate and 0.25 part of benzoyl peroxide were emulsified and polymerized as in Example 1. A stable resin dispersion was obtained.

*Example 12*

The product of Example 11 was exhausted from dilute aqueous dispersions by viscose process rayon, cellulose acetate rayon, silk and nylon when applied as in Example 2, 3, 4 and 5. Noticeable delustering, added fullness and a noticeable increase in stiffness were obtained on the fabrics. Improved snag resistance was obtained on the nylon stocking and on the silk stocking.

*Example 13*

0.5 gram of the product from Example 9 was dispersed in 200 cc. of soft water containing 0.1 gram of acetic acid; the pH of the bath was 3.5. The bath was contained in a pint Mason jar. A ten-gram piece of lustrous, black dyed, viscose process rayon knit glove fabric was entered in the bath and agitated for 15 minutes at 95° F. At least 90% of the dispersed resin was absorbed by the goods from the bath. The goods were extracted and dried at about 200° F. The goods were delustered and had a full, soft hand.

*Example 14*

Lustrous, black dyed cellulose acetate piece-goods were treated as in Example 13. The goods were delustered and had a full, soft hand.

*Example 15*

Cetyl pyridinium bromide was substituted for stearyl trimethyl ammonium bromide in Example 1. A stable dispersion was obtained which exhausted onto wool, silk, nylon, viscose process rayon, and cellulose acetate rayon when applied as in Examples 2, 3, 4, 5 and 6, to give similar finishes.

*Example 16*

Technical dodecyl trimethyl ammonium bromide was substituted for stearyl trimethyl ammonium bromide in Example 1. A stable dispersion was obtained which exhausted onto wool, silk, nylon, viscose process rayon and cellulose acetate rayon when applied as in Examples 2, 3, 4, 5 and 6. Similar finishes were obtained.

*Example 17*

The condensation product of diethanol amine and stearic acid condensed with dimethyl sulfate, (a product of U. S. Patent 2,096,749), was substituted for stearyl trimethyl ammonium bromide in Example 9. A stable dispersion was obtained which exhausted onto wool, silk, nylon, viscose process rayon and cellulose acetate rayon when applied as in Examples 2, 3, 4, 5 and 6; the finishes obtained were similar.

*Example 18*

The reaction product of trimethylamine and alpha brom stearic acid (see U. S. Patent 2,129,264, Example 1) was substituted for stearyl trimethyl ammonium bromide in Example 1. A stable dispersion was obtained. The dispersion exhausted on silk when applied as in Example 4 and on viscose process rayon when applied as in Example 2 with an adjustment in pH to 4.5. The finishes obtained were similar to those of Examples 2 and 4.

*Example 19*

(a) 2.5 parts of bleached sulfite pulp were placed in a beater in 90.0 parts of soft water and the bath was adjusted to a pH of 5.5. 0.025 part of the product of Example 17 was dispersed in 7.475 parts of water and added to the beater. The pulp, water and resinous dispersion were agitated 20 minutes at 70° F. The resulting mass was removed from the beater, filtered and the amount of dispersion not retained by the paper was determined by a turbidity method. About 90% of the dispersion was exhausted from the bath, and the wet strength of the paper was markedly increased.

(b) The pH of the pulp (as in Example 19a) in water was adjusted to 7.0 and the run repeated. Similar results were obtained.

(c) The pH of the pulp (as in Example 19a) in water was adjusted to 8.0 and the run repeated. Similar results were obtained.

*Example 20*

25.0 parts of vinyl acetate monomer containing 0.25 part of benzoyl peroxide were mixed with 70.67 parts of an aqueous solution containing 2.5 parts of a partially saponified polyvinyl acetate (having a saponification number of 180 and a viscosity of 40 c. p. as a 4% aqueous solution at 20° C.), 0.025 part of technical dodecyl diethylcyclohexylamine sulfate, and 0.5 part of stearyl trimethyl ammonium bromide by means of high speed agitation. 3.8 parts of a 32% basic aluminum acetate solution and 0.53 part of glacial acetic acid were added while continuing the agitation. The resulting emulsion was agitated for a total of 3 minutes and then aged 6 hours at 60° C. to obtain a stable dispersion of a resinous polymer.

*Example 21*

The product of Example 20 was applied to viscose process rayon crepe, cellulose acetate rayon, silk, nylon and wool as in Examples 2, 3, 4, 5 and 6. A marked sizing and stiffening effect was obtained in each case.

*Example 22*

6.25 parts of vinyl acetate monomer and 18.75 parts of n-butyl methacrylate monomer were emulsified as in Example 20 with a partially saponified polyvinyl acetate having a saponification number of 110 and a viscosity of 20 c. p. as a 4% aqueous solution at 20° C.

*Example 23*

The product of Example 22 was applied to viscose process rayon crepe and silk as in Examples 2 and 4. A full, crisp hand was obtained in each case.

*Example 24*

0.50 gram of the product of Example 17 and 0.25 gram of Composition A (see below) were applied to a full-fashioned silk stocking as in Example 4.

COMPOSITION A

| | Per cent |
|---|---|
| Refined paraffin wax | 16.70 |
| Aluminum acetate | 3.00 |
| Acetate of deacetylated chitin | 1.30 |
| Acetic acid | 0.50 |
| Technical dodecyl diethyl cyclohexylamine sulfate | 0.09 |
| Water | 78.41 |

The stocking had a full, firm hand, excellent water repellency and considerable surface slip. The finish was resistant to laundering.

*Example 25*

20.0 parts of vinyl acetate monomer and 5 grams of di(butoxy ethyl) phthalate were emulsified and aged as in Example 20 to obtain a stable dispersion of a resinous polymer.

*Example 26*

The product from Example 20 was substituted for the product from Example 17 in Example 24. The finished stocking had a full, crisp hand and was highly water repellent. The finish was resistant to laundering.

*Example 27*

0.75 gram of the product from Example 20 was applied to a 10 gram nylon stocking by the procedure of Example 5. A full, stiff, crisp hand was obtained. The stocking was highly snag resistant. The finish was resistant to laundering.

*Example 28*

Equal parts of aluminum formate and formic acid were substituted for the aluminum acetate and acetic acid in Example 1. A stable dispersion was obtained. The dispersed resin was exhausted from dilute aqueous dispersions by viscose process rayon, cellulose acetate rayon, silk and nylon when applied as in Examples 2, 3, 4 and 5.

*Example 29*

Equal parts of barium chloride were substituted for the aluminum acetate in Example 1. Similar results were obtained.

The methods used in preparing substantive dispersions of methacrylate derivatives and vinyl alcohol esters in this case are applicable to water insoluble polymerizable hydrocarbons and particularly to vinylidene compounds. Other vinylidene compounds that may be used are vinyl chloride, styrene, butadiene acrylamides, methacrylamides, acrylonitriles and methacrylonitriles. All of these are conjugated compounds.

The technical dodecyl diethyl cyclohexylamine sulfate can be omitted or replaced by other surface active agents as, for example, water soluble salts of alkyl naphthalene sulfonic acids, fatty alcohol sulfates and alkyl sulfonic acids.

The cationic surface active agents may include not only stearyl trimethyl ammonium bromide, technical dodecyl trimethyl-ammonium bromide, cetyl pyridinium bromide, and the condensation product of diethanolamine and stearic acid condensed with dimethyl sulfate but also long chain alkyl ammonium, sulfonium, and phosphonium halides, and long chain pyridinium halides. The length of the alkyl chain on the surface active agents is preferably 12 to 18 carbon atoms.

The reaction product of trimethyl amine and alphabrom stearic acid, (see U. S. Patent 2,129,264, Example 1) is not a cationic surface active agent in alkaline solution but does have a high affinity for cellulosic materials in the pH range 3 to 5. It acts to provide substantivity to the resin dispersions in this pH range, particularly in the presence of multivalent and heavy metal water soluble salts. Similar compounds containing other alkyl groups with chain length 12 to 18 carbon atoms can be used.

The aluminum acetate may be replaced by water soluble salts of Ba, Sr, Cr, Al, Cd, Co, Fe, Ni, Zn, Sn, Pb, Sb, and Bi. The acetate acid can be replaced by formic acid and other organic acids which form soluble salts of the metals. Acetic or formic acid are preferred because they are weak volatile acids that do not tender textile fibers under conditions of application. The metal salts can be added during emulsification or after the dispersion is formed.

Compositions can be prepared as indicated in Examples 1, 7, 9, 11, 15, 16, 17, 18, 20, 22, and 25 which do not contain aluminum acetate or acetic acid. These products which do not contain aluminum acetate or acetic acid have been found to be substantive to viscose process rayon, cellulose acetate rayon, silk, wool, and nylon when these products were applied to textile fabrics as indicated in Examples 2 to 6. Compositions which exhaust on textiles can therefore be prepared without using aluminum acetate or an equivalent salt of a multivalent metal.

Other substantially non-polar high molecular weight water-soluble protective colloids may be used in place of partially saponified polyvinyl acetate. Examples of other substantially non-polar high molecular weight water-soluble protective colloids include cellulose derivatives such as water-soluble methyl cellulose, the ethylene oxide reaction product of oleyl alcohol, etc.

Other plasticizers than di-(methyl cyclohexyl) adipate can be used. Examples of suitable plasticizers are given by Strain, Kennelly, and Dittmar, Ind. Eng. Chem. 31, 382 (1939).

Compositions described in this invention are useful in sizing and delustering viscose process rayon and cellulose acetate piece-goods and knit fabrics. The application of the resins to light-weight knit fabrics helps to prevent their curling on the cutting table. The degree of bodying and stiffness obtained varies widely and depends on the type resin used.

The compositions are of value as sizing agents for all types of textiles and for paper. The compositions are of excellent value for the finishing of silk hosiery. The plasticized compositions and particularly vinyl acetate compositions are useful for producing snag resistant finishes on nylon hosiery.

A primary advantage of the compositions covered in this invention is their application to textiles of all types including animal fibers, nylon, and cellulosic materials, and to paper by a process of exhaustion from a dilute bath. The compositions are particularly adapted to the treatment of knitted fabrics which cannot be handled satisfactorily on a quetsch. They can be applied to fabrics containing mixed fibers and particularly to fabrics containing mixtures of wool and rayon staple in plants such as woolen mills which ordinarily are not equipped to handle goods on a quetsch.

The application of the compositions herein described to silk and nylon hosiery produces a finish which has several advantages. These finishes tend to deluster the stocking and this delustering effect endures for the life of the stocking. When the resin dispersion is applied along with a positively charged substantive wax dispersion a water repellent spot resistant finish is obtained that is more durable than the effect obtained from the wax finish alone. The treated stockings are more sheer in appearance and the finish is more durable and faster to washing. By following the processes herein described more uniform reproducible finishes can be obtained. The fact that the finish is completely exhausted from the bath makes it possible to obtain the same amount of finish on stockings from batch to batch regardless of the size of the batch and the ratio of bath to goods. These finishes improve the resistance of the stocking to snagging. Stockings which have been finished in accordance with this invention board and are handled more easily and have a pleasing hand and better appearance.

So far as is known these are the only compositions which have a high affinity for cellulosic materials and which can be applied by a process of exhaustion from a dilute bath.

The method of preparing the dispersions is highly advantageous. The preparation of solvent-free dispersion by the method of emulsion polymerization is highly desirable. The surface active agents used to promote substantivity cannot always be used as emulsifying agents alone since they do not always maintain stable dispersions during aging. Protective colloids as glue, starch, and natural gums are unsatisfactory for the same reason. The particular combination of surface active agents and partially saponified polyvinyl acetate used as emulsifying agents in the preparation of aqueous dispersions of polymerized conjugated compounds as described in this invention is of critical importance.

The claims in this case are intended to cover not only the products described herein but also to generically cover the products described and specifically claimed in my copending application Serial No. 351,087 filed on this same day to which reference may be made for further disclosure. The products of the aforesaid application differ from the products herein described in that another resin is dissolved in the liquid conjugated compound prior to polymerization.

The above description and examples are intended to be illustrative only and not to limit the scope of the invention. Any departure therefrom which conforms to the spirit of the invention is intended to be included within the scope of the appended claims.

I claim:

1. A substantive textile finishing composition adapted for application to textile fibers by a process of exhaustion from a dilute aqueous bath comprising a stable aqueous dispersion of a polymerized vinylidene compound containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as an agent which renders the dispersed polymerized vinylidene compound substantive to textile fibers a cationic surface active agent.

2. A substantive textile finishing composition adapted for application to textile fibers by a process of exhaustion from a dilute aqueous bath comprising a stable aqueous dispersion of a polymerized vinylidene compound containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as agents which render the dispersed polymerized vinylidene compound substantive to textile fibers a cationic surface active agent and a water soluble salt of a multivalent metal.

3. A substantive textile finishing composition adapted for application to textile fibers by a process of exhaustion from a dilute aqueous bath comprising a stable aqueous dispersion of a polymerized vinyl acetate containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as an agent which renders the dispersed polymerized vinyl acetate substantive to textile fibers a cationic surface active agent.

4. A substantive textile finishing composition adapted for application to textile fibers by a process of exhaustion from a dilute aqueous bath comprising a stable aqueous dispersion of a polymerized alkyl methacrylate containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as an agent which renders the dispersed polymerized alkyl methacrylate substantive to textile fibers a cationic surface active agent.

5. A substantive textile finishing composition adapted for application to textile fibers by a process of exhaustion from a dilute aqueous bath comprising a stable aqueous dispersion of a polymerized methyl methacrylate containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as an agent which renders the dispersed polymerized methyl methacrylate substantive to textile fibers a cationic surface active agent.

6. A substantive textile finishing composition adapted for application to textile fibers by a process of exhaustion from a dilute aqueous bath comprising a stable aqueous dispersion of a polymerized butyl methacrylate containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as an agent which renders the dispersed polymerized butyl methacrylate substantive to textile fibers a cationic surface active agent.

7. A substantive textile finishing composition adapted for application to textile fibers by a process of exhaustion from a dilute aqueous bath comprising a stable aqueous dispersion of a polymerized vinylidene compound containing as the dispersing agent a partially saponified polyvinyl acetate, and as an agent which renders the dispersed polymerized vinylidene compound substantive to textile fibers a cationic surface active agent.

8. A substantive textile finishing composition adapted for application to textile fibers by a process of exhaustion from a dilute aqueous bath comprising a stable aqueous dispersion of a polymerized vinylidene compound containing as the dispersing agent a partially saponified polyvinyl acetate, and as agents which render the dispersed polymerized vinylidene compound substantive to textile fibers a cationic surface active agent and a water soluble salt of a multivalent metal.

9. A substantive textile finishing composition adapted for application to textile fibers by a process of exhaustion from a dilute aqueous bath comprising a stable aqueous dispersion of a polymerized alkyl methacrylate containing as the dispersing agent a partially saponified polyvinyl acetate, and as an agent which renders the dispersed polymerized alkyl methacrylate substantive to textile fibers a cationic surface active agent.

10. A substantive textile finishing composition adapted for application to textile fibers by a process of exhaustion from a dilute aqueous bath comprising a stable aqueous dispersion of a polymerized methyl methacrylate containing as the dispersing agent a partially saponified polyvinyl acetate, and as an agent which renders the dispersed polymerized methyl methacrylate substantive to textile fibers a cationic surface active agent.

11. A substantive textile finishing composition adapted for application to textile fibers by a process of exhaustion from a dilute aqueous bath comprising a stable aqueous dispersion of a polymerized butyl methacrylate containing as the dispersing agent a partially saponified polyvinyl acetate, and as an agent which renders the dispersed polymerized butyl methacrylate substantive to textile fibers a cationic surface active agent.

12. A substantive textile finishing composition adapted for application to textile fibers by a process of exhaustion from a dilute aqueous bath comprising a stable aqueous dispersion of a polymerized vinylidene compound containing as the dispersing agent a partially saponified polyvinyl acetate, and as an agent which renders the dispersed polymerized vinylidene compound substantive to textile fibers a cationic surface active quaternary ammonium compound.

13. A substantive textile finishing composition adapted for application to textile fibers by a process of exhaustion from a dilute aqueous bath comprising a stable aqueous dispersion of a polymerized vinylidene compound containing as the dispersing agent a partially saponified polyvinyl acetate, and as an agent which renders the dispersed polymerized vinylidene compound substantive to textile fibers a cationic surface active agent and a water soluble barium salt.

14. A substantive textile finishing composition adapted for application to textile fibers by a process of exhaustion from a dilute aqueous bath comprising a stable aqueous dispersion of a polymerized vinylidene compound containing as the dispersing agent a partially saponified polyvinyl acetate, and as an agent which renders the dispersed polymerized vinylidene compound substantive to textile fibers a cationic surface active agent and a water soluble aluminum salt of a volatile organic acid.

15. A substantive textile finishing composition adapted for application to textile fibers by a process of exhaustion from a dilute aqueous bath comprising a stable aqueous dispersion of a polymerized alkyl methacrylate containing as the dispersing agent a partially saponified polyvinyl acetate, and as agents which render the dispersed polymerized alkyl methacrylate substantive to textile fibers a cationic surface active agent and a water soluble aluminum salt.

16. A substantive textile finishing composition adapted for application to textile fibers by a process of exhaustion from a dilute aqueous bath comprising a stable aqueous dispersion of a polymerized methyl methacrylate containing as the dispersing agent a partially saponified polyvinyl acetate, and as agents which render the dispersed polymerized methyl methacrylate substanative to textile fibers a cationic surface active agent and a water soluble aluminum salt.

17. A substantive textile finishing composition adapted for application to textile fibers by a process of exhaustion from a dilute aqueous bath comprising a stable aqueous dispersion of a polymerized butyl methacrylate containing as the dispersing agent a partially saponified polyvinyl acetate, and as agents which render the dispersed polymerized butyl methacrylate substantive to textile fibers a cationic surface active agent and a water soluble aluminum salt.

JOSEPH EDWARD SMITH.